Dec. 5, 1967 G. W. WOSTER 3,356,865

CONTROLLABLE PHASE SHIFT CIRCUIT

Filed July 6, 1965

INVENTOR.
George W. Woster

BY

Hovey, Schmidt, Johnson & Hovey.
ATTORNEYS.

3,356,865
CONTROLLABLE PHASE SHIFT CIRCUIT
George W. Woster, Mission, Kans., assignor to Wilcox Electric Company, Inc., Kansas City, Mo., a corporation of Kansas
Filed July 6, 1965, Ser. No. 469,391
10 Claims. (Cl. 307—88.5)

This invention relates to an electrically controllable phase shift circuit having particular application in the supplying of an electrical signal to a relatively low impedance load.

In omnirange radio navigation systems proper phasing of carrier and modulating signals is requisite if azimuth detection at the aircraft is to be accurate. Particularly, the omnidirectional reference carrier must be phase locked with the goniometer output signals or azimuth error will occur.

The use of controllable phase shift circuits in the radio navigation art is, therefore, necessary in order that a navigation system may be properly aligned. It is desirable to provide a means of detecting phase errors in the system, and then converting such detection into an automatic phase error correction. With the introduction and increasingly wide usage of transistors in circuit design, however, the problem of finding a suitable electrically controllable phase shift network has arisen since the transistor, unlike vacuum tubes, has a relatively low impedance input.

The utilization of conventional L-section or pi-network phase shift circuits has been found to be unsatisfactory because the shunt arms of the circuits exhibit a sufficiently low impedance to cause excessive current drain therethrough in shunt relationship to a subsequent transistor amplifier input. This undesirable effect is especially predominant through the midportion of the phase control range of the phase shift circuit where losses in the circuit become quite high.

It is, therefore, the primary object of this invention to provide an electrically controllable phase shift circuit which may be utilized with relatively low impedance loads without encountering excessive shunt current loading.

As a corollary to the above object, it is also an important aim of the instant invention to provide such a circuit which will lessen the aforesaid shunt current drain and attendant midrange attenuation by the provision of means which automatically increases the shunt impedance of the phase shift circuit while simultaneously decreasing the series impedance thereof to vary the degree of phase shift.

Other objects will become apparent as the detailed description proceeds.

Figure 1:
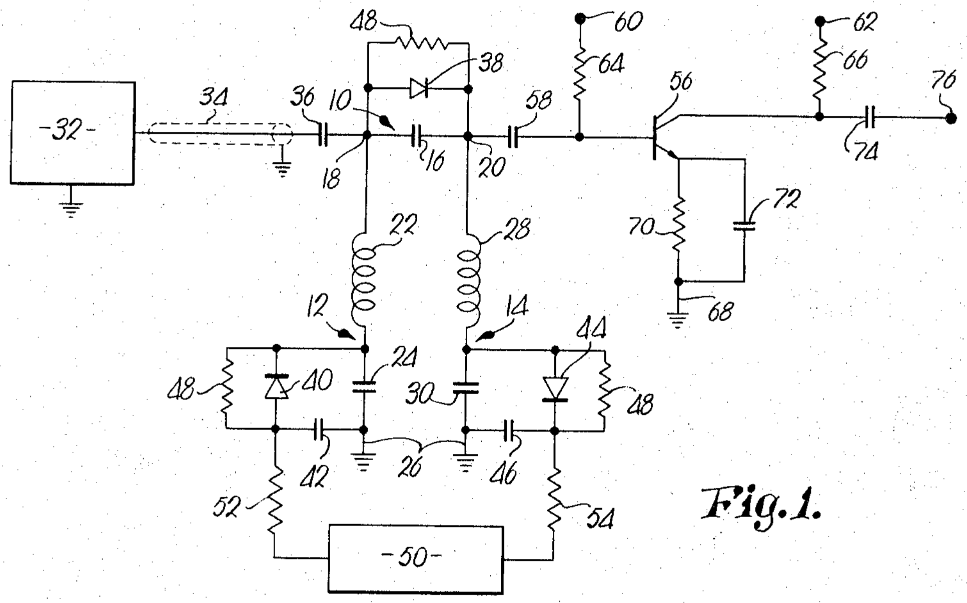
FIGURE 1 is an electrical schematic diagram showing the circuit of the instant invention.

Referring to FIG. 1, the phase shift circuit of the instant invention is there illustrated in pi-network configuration, such network comprising a series arm 10 and a pair of shunt arms 12 and 14. Series arm 10 comprises a capacitor 16 connected in series between an input terminal 18 of the circuit and an output terminal 20 thereof. Shunt arm 12 comprises an inductor 22 and a capacitor 24 connected in series between input terminal 18 and a common terminal or ground connection as at 26. Shunt arm 14 is of like configuration and comprises an inductor 28 connected in series with a capacitor 30, the series combination being connected between output terminal 20 and ground 26.

A preceding stage is illustrated at 32, such stage comprising, for example, an RF signal source such as a carrier voltage. Coaxial line 34 connects the output of stage 32 with input terminal 18 via coupling capacitor 36.

A diode 38 is connected in parallel with capacitor 16, the anode of the diode being connected to terminal 18 while the cathode thereof is connected to terminal 20. A diode 40 is connected in parallel relationship to capacitor 24, the cathode of diode 40 being connected to the junction point between inductor 22 in capacitor 24, while the anode thereof is coupled with ground 26 via RF bypass capacitor 42. Similarly, a diode 44 is coupled in parallel relationship to capacitor 30, the anode of diode 44 being connected to the junction point between inductor 28 and capacitor 30, while the cathode thereof is coupled with ground 26 via RF bypass capacitor 46. It should be noted that the three diodes 38, 40 and 44 are poled in series relationship to one another; the significance of this arrangement will become apparent hereinafter. A bleed resistor 48 is connected in parallel with each of the diodes.

A controllable DC voltage source 50 has its output connected to the anode of diode 40 and the cathode of diode 44 by RF decoupling resistors 52 and 54. Source 50 may comprise any of a number of conventional apparatuses including, for example, circuitry for detecting a phase error between two electrical signals and producing a DC output voltage having a magnitude proportional to the detected phase error.

An NPN transistor 56 serves as the active elements of a common emitter buffer or output amplifier having a base input connected to output terminal 20 of the phase shift circuit by a coupling capacitor 58. The stage is operated by positive DC voltages applied at 60 and 62, a base bias feed resistor 64 being connected between supply point 60 and the base of transistor 56, while a collector DC feed resistor 66 is connected between supply point 62 and the transistor collector. The negative electrical side of the DC operating source for the transistor stage is illustrated by a ground connection 68, an emitter bias resistor 70 and a bypass capacitor 72 being connected in parallel between the emitter of the transistor and ground connection 68. A coupling capacitor 74 connects the collector to a stage output terminal 76.

In the operation of the circuit it will first be assumed that source 50 is delivering a voltage having a polarity which reverse biases the three diodes 38, 40 and 44. This is illustrated at 78 on the characteristic curve of FIG. 2, point 78 representing a reverse bias of −0.3 volt across each diode. The characteristic curve is a plot of applied voltage across the cathode and anode of each diode as abscissa, against the impedance presented by the diode as ordinate. The numerical voltages illustrated are representative of a typical germanium diode.

Figure 2:
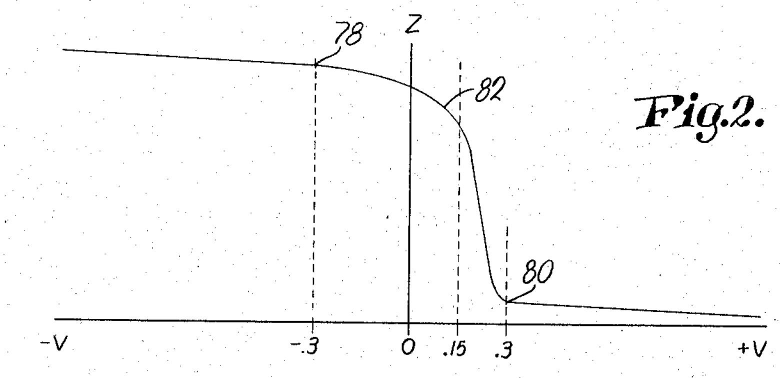
FIG. 2 is a graph showing the characteristic curve of one of the control diodes.

At the voltage condition represented by point 78 of FIG. 2, the anode of diode 40 is negative with respect to the cathode of diode 44. At this time the impedance of the diodes are quite high and thus only the leakage current through the diodes and the bleed current through resistors 48 flow in shunt relationship to respective capacitors 16, 24 and 30. Therefore, under this circuit condition the net reactances of arms 12 and 14 are at a minimum and the impedance between terminals 18 and 20 is at a maximum.

The foregoing conditions provide maximum phase shift through the circuit, i.e., the maximum obtainable phase difference exists between the voltage applied across terminal 18 and ground and the voltage obtained across terminal 20 and ground. It should be understood that the provision of resistors 48 is for the purpose of rendering the voltage drops across the three diodes uniform when reverse biased, resistors 48 being selected so that the bleed current therethrough is large relative to the leakage current through the back biased diodes.

As the voltage output from source 50 gradually swings from negative to positive, it will be appreciated from FIG. 2 that the impedances of the diodes decrease until point 80 is reached on the characteristic curve, whereupon the diodes are placed in heavy conduction and effectively short circuit capacitors 16, 24 and 30. Thus, the portion of the characteristic curve between points 78 and 80 constitutes the operating range or phase control range of the circuit.

If it is now assumed that the voltage output from source 50 gradually swings positive (the anode of diode 40 positive with respect to the cathode of diode 44) it will be appreciated that current flow in shunt relationship to capacitors 16, 24 and 30 progressively increases. This, in turn, lowers the impedance between terminals 18 and 20 by effectively by-passing capacitor 16. Simultaneously, the impedance between terminals 18 and 20 and ground increases because the net reactance of each of the shunt arms 12 and 14 rises. Inductors 22 and 28 have a substantially greater ohmic reactance value than their associated capacitors 24 and 30; therefore, the increase in the net reactance of each shunt arm is caused by a decrease in the contribution of capacitors 24 and 30 to the net reactances of their respective arms effected by the bypassing affect of diodes 40 and 44.

Figure 3:
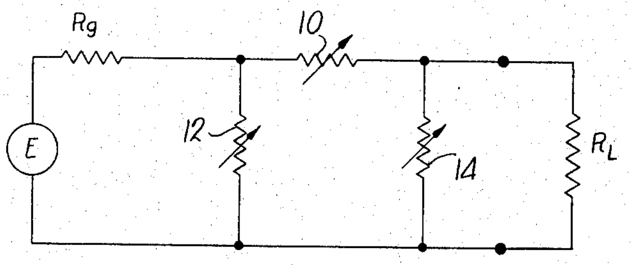
FIG. 3 is an electrical schematic diagram of the equivalent circuit of the instant invention.

Referring to FIG. 2, the midportion of the phase control range is represented by point 82. Without the shunt impedance increase provided by the instant invention, signal attenuation through this portion of the phase control range would be excessive due to current loading in the shunt arms. This may be readily appreciated with reference to the equivalent circuit of the instant invention shown in FIG. 3, where the controllable series and shunt arms are represented by variable impedances. The phase shift circuit is illustrated as being fed by a source E having an internal impedance $R_g$, the load impedance or impedance of the succeeding stage being designated $R_L$. It will be appreciated that, as impedance 10 decreases, an increase in the impedances of the shunt arms 12 and 14 is necessary or the input impedance seen by the load $R_L$ will drop. This is to be avoided where $R_L$ is a relatively low impedance load (such as a transistor amplifier stage as illustrated in FIG. 1) since the low impedance load is inherently current driven rather than voltage driven.

Although the phase shift range will be reduced, one of the shunt arms 12 or 14 may be removed from the circuit to provide an L-section phase shift network which also possesses the advantages discussed hereinabove. Using the full pi-network arrangement illustrated, it has beenfound that a phase shift range of from approximately 0° to 330° is obtainable since the input coupling capacitor 36 in combination with the pi-network effectively forms two L-sections. Furthermore, the phase shift range of the circuit is also enhanced by virtue of the variation of the net reactances of the shunt arms, as well as the series impedance of the circuit.

The instant invention enables the transistor output stage to provide a more constant output signal at terminal 76 with variations in the degree of phase shift through the shifter circuit. Since some output level variations will be present due to changes in the attenuation of the phase shift circuit resulting from diode losses which vary over the phase control range, one or more saturated amplifier stages may be coupled with output terminal 76 if additional minimization of output level variations is desired.

Having thus described the invention, what is claimed as new and desired to be secured by Letters Patent is:

1. A controllable phase shift circuit for use with a relatively low impedance load, said circuit comprising:
- first and second terminals for receiving an applied, time-varying voltage;

- a third terminal adapted for coupling with said load;
- a first impedance arm coupled in series between said first and third terminals;
- a second impedance arm coupled with said first arm and said second terminal and presenting a current path in shunt relationship to said first and second terminals,
- said arms having net reactances of opposite sign;
- variable impedance means coupled with both of said arms; and
- means coupled with said variable impedance means for operating the latter to vary the impedance thereof over a phase control range whereby, upon application of said voltage to said first and second terminals, the voltage appearing across said third and second terminals is shifted in phase with respect to the applied voltage in accordance with the impedance of said variable impedance means,
- said operating means being operable to raise the impedance between said first arm and said second terminal while simultaneously lowering the impedance between said first and third terminals, whereby to prevent excessive current loading of said second arm.

2. The invention of claim 1, wherein said second arm includes a reactive element having a sign opposite to the sign of the net reactance of the second arm, said variable impedance means including a device coupled with said element for controlling current flow therethrough to thereby control the value of the net reactance of said second arm.

3. The invention of claim 1, wherein said variable impedance means includes an electrically responsive, variable impedance device coupled with each of said arms respectively, said operating means including means for applying a control signal to said devices to set the impedance of each device at a value corresponding to a desired phase shift.

4. The invention of claim 3, wherein said second arm includes a reactive element having a sign opposite to the sign of the net reactance of the second arm, the device associated with said second arm being operably coupled with said element for controlling current flow therethrough to thereby control the value of the net reactance of said second arm.

5. A controllable phase shift circuit for use with a relatively low impedance load, said circuit comprising:
- first and second terminals for receiving an applied, time-varying voltage;
- a third terminal adapted for coupling with said load;
- a first impedance arm coupled in series between said first and third terminals;
- a second impedance arm coupled with said first arm and said second terminal and presenting a current path in shunt relationship to said first and second terminals,
- said arms having net reactances of opposite sign, the second arm including a reactive element having a sign opposite to the sign of the net reactance of said second arm;
- a pair of electrically responsive, variable impedance devices, each having a pair of electrical connection points and means for progressively decreasing the impedance between said points in response to a change in one direction of the magnitude of an electrical potential applied across said points;
- means operably coupling one of said devices with said first arm;
- means operably coupling the other of said devices with said element; and
- means coupled with said devices for applying a control signal thereto across the connection points of each of said devices to effect a simultaneous, progressive decrease in the impedance of each device over a phase control range in response to a change in the magnitude of the control signal in said one direction whereby, during said change, the impedance between said first arm and said second terminal increases while the impedance between said first and third terminals decreases to prevent excessive current loading of said second arm and whereby, upon application of said voltage to said first and second terminals, the voltage appearing across said third and second terminals is shifted in phase with respect to the applied voltage in accordance with impedances of said devices.

6. A controllable phase shift circuit for use with a relatively low impedance load, said circuit comprising:
first and second terminals for receiving an applied, time-varying voltage;
a third terminal adapted for coupling with said load;
a first impedance arm coupled in series between said first and third terminals, and having a net capacitive reactance at the frequency of said voltage;
a second impedance arm coupled with said first arm and said second terminal and presenting a current path in shunt relationship to said first and second terminals,
said second arm including an inductor and a capacitor coupled in series, said inductor having a greater reactance at the frequency of said voltage than the reactance of said capacitor;
a first diode coupled in parallel with said first arm;
a second diode coupled in parallel with said capacitor and poled in series relationship to said first diode; and
means coupled with said diodes for applying a control signal thereto to effect a simultaneous, progressive decrease in the impedance of each diode over a phase control range in response to a change in the magnitude of the control signal in the forward conduction direction of the diodes whereby, during said change, the impedance between said first arm and said second terminal increases while the impedance between said first and third terminals decreases to prevent excessive current loading of said second arm and whereby, upon application of said voltage to said first and second terminals, the voltage appearing across said third and second terminals is shifted in phase with respect to the applied voltage in accordance with the impedances of said diodes.

7. A controllable, wide range, pi-network phase shift circuit for use with a relatively low impedance load, said circuit comprising:
first and second terminals for receiving an applied, time-varying voltage;
a third terminal adapted for coupling with said load;
a first impedance arm coupled in series between said first and third terminals;
a second impedance arm coupled in series between said first and second terminals;
a third impedance arm coupled in series between said third and second terminals,
said first arm having a net reactance of a sign opposite to the net reactances of said second and third arms, the second and third arms each including an impedance element having a sign opposite to the sign of the net reactance of said second and third arms;
three electrically responsive, variable impedance devices, each having a pair of electrical connection points and means for progressively decreasing the impedance between said points in response to a change in one direction of the magnitude of an electrical potential applied across said points;
means operably coupling the first of said devices with said first arm;
means operably coupling the second and third of said devices with respective elements; and
means coupled with said devices for applying a control signal thereto across the connection points of each of said devices to effect a simultaneous, progressive decrease in the impedance of each device over a phase control range in response to a change in the magnitude of the control signal in said one direction whereby, during said change, the impedance between said first arm and said second terminal increases while the impedance between said first and third terminals decreases to prevent excessive current loading of said second and third arms and whereby, upon application of said voltage to said first and second terminals, the voltage appearing across said third and second terminals is shifted in phase with respect to the applied voltage in accordance with the impedances of said devices.

8. A controllable, wide range, pi-network phase shift circuit for use with a relatively low impedance load, said circuit comprising:
first and second terminals for receiving an applied, time-varying voltage;
a third terminal adapted for coupling with said load;
a first impedance arm coupled in series between said first and third terminals, and having a net capacitive reactance at the frequency of said voltage;
second and third impedance arms coupled between said first and second terminals and said third and second terminals, respectively, and each including an inductor coupled in series with a capacitor, the inductor having a greater reactance at the frequency of said voltage than said capacitor;
a first diode coupled in parallel with said first arm;
second and third diodes coupled in parallel with respective capacitors and poled in series relationship to said first diode; and
means coupled with said diodes for applying a control signal thereto to effect a simultaenous, progressive decrease in the impedance of each diode over a phase control range in response to a change in the magnitude of the control signal whereby, during said change, the impedance between said first arm and said second terminal increases while the impedance between said first and third terminals decreases to prevent excessive current loading of said second and third arms and whereby, upon application of said voltage to said first and second terminals, the voltage appearing across said third and second terminals is shifted in phase with respect to the applied voltage in accordance with the impedances of said diodes.

9. Phase shift apparatus comprising:
first and second terminals for receiving an applied, time-varying voltage;
a transistor amplifier stage having an input and an output;
a first impedance arm coupled in series between said first terminal and said input–;
a second impedance arm counpled with said first arm and said second terminal and presenting a current path in shunt relationship to said first and second terminals,
said arms having net reactances of opposite sign;
variable impedance means coupled with both of said arms; and
means coupled with said variable impedance means for operating the latter to vary the impedance thereof over a phase control range whereby, upon application of said voltage to said first and second terminals, the voltage appearing across said input and said second terminal is shifted in phase with respect to the applied voltage in accordance with the impedance of of said variable impedance means,
said operating means being operable to raise the impedance between said first arm and said second terminal while simultaneously lowering the impedance between said first terminal and said input, whereby to prevent excessive current loading of said second arm by the transistor stage and provide a relatively low impedance driver for the stage to maintain the voltage appearing at said output relatively constant over the phase control range.

10. The invention of claim 9, wherein said second arm includes a reactive element having a sign opposite to the sign of the net reactance of the second arm, said variable impedance means including a first electrically responsive, variable impedance device coupled with said first arm, and a second electrically responsive, variable impedance device coupled with said element, said operating means including means for applying a control signal to said devices to set the impedance of each device at a value corresponding to a desired phase shift.

References Cited

UNITED STATES PATENTS

| | | | |
|---|---|---|---|
| 2,753,519 | 7/1956 | Fischman | 323—122 |
| 3,153,139 | 10/1964 | Sweeney | 323—66 |
| 3,287,626 | 11/1966 | Sprague | 323—122 |
| 3,287,628 | 11/1966 | Keiper | 323—123 |

ARTHUR GAUSS, *Primary Examiner.*

J. A. JORDAN, *Assistant Examiner.*